(12) United States Patent
Matsuzaki

(10) Patent No.: US 6,290,027 B1
(45) Date of Patent: Sep. 18, 2001

(54) BRAKE PAD WEAR DETECTOR

(75) Inventor: Yoshiki Matsuzaki, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/358,261

(22) Filed: Jul. 20, 1999

(30) Foreign Application Priority Data

Jul. 22, 1998 (JP) .................................................. 10-205944

(51) Int. Cl.[7] .................................................. F16D 66/00
(52) U.S. Cl. .................................. 188/1.11 L; 188/1.11 E
(58) Field of Search ........................ 188/1.11 W, 1.11 L, 188/1.11 E; 340/454; 116/208

(56) References Cited

U.S. PATENT DOCUMENTS

| 5,454,450 | * | 10/1995 | Tanigawa | 188/1.11 L |
| 6,095,290 | * | 8/2000 | Takanashi | 188/1.11 L |

FOREIGN PATENT DOCUMENTS

| 4-95701 | 3/1992 | (JP) . |
| 6-22637 | 3/1994 | (JP) . |
| 6-24244 | 3/1994 | (JP) . |

OTHER PUBLICATIONS

An English Language abstract of JP 6–24244.
An English Language abstract of JP 4–95701.

* cited by examiner

*Primary Examiner*—Pam Rodriguez
(74) *Attorney, Agent, or Firm*—Greenblum & Bernstein, P.L.C.

(57) ABSTRACT

The shape of a lead wire for detecting the wear of a brake pad is improved to detect the limit height of a rib on a disk rotor, and wear limit of a lining of the brake pad. A probe is engaged in the outer peripheral portion of each of back plates of brake pads provided on both sides of a disk rotor and has a lead wire buried in the probe. The wire is curved to protrude a predetermined distance toward the disk rotor. The predetermined distance is larger than a predetermined maximum allowable height of an annular rib on the disk rotor at its outer peripheral portion.

3 Claims, 7 Drawing Sheets

BRAKE PAD WEAR DETECTOR

BACKGROUND OF THE INVENTION

The present invention relates to a brake pad wear detector for detecting wear of brake pads of a disk brake for automobiles.

There is known a method of predicting when to replace brake pads by mounting a detector (hereinafter called probe) at a wear limit position of the brake pads to detect wear of lining of a brake pad, and electrically detecting breakage of a lead wire based on a change in voltage. The probe is easily attachable to and detachable from brake pads which are expendable. In order to accurately detect the wear limit of linings, various mounting structures have been proposed.

FIG. 4 shows a structure for mounting a brake pad wear detector proposed in Japanese utility model publication 6-22637 filed by the present applicant. A probe 101 is provided inside of the outer edge of a lining 1 of a brake pad 3, and is resiliently mounted by a resilient clip 5 in a cutout 4 formed in a back plate 2 of the brake pad 3 at its outer edge.

FIG. 5 is an enlarged perspective view of the cutout. The cutout 4, into which the probe 101 is inserted from the outer periphery of the brake pad 3 in a radial direction of the disk rotor (not shown), has straight guide rails 4a extending in the direction of thickness of the back plate 2 and slightly narrower than guide grooves 101a formed in the probe 101 (FIG. 6). A curved cutout 4b is provided at a side of the back plate 2 opposite the lining 1 and has shoulders 4c.

FIG. 6 is a perspective view of the probe 101. A lead wire 102 for detecting the wear of the lining 1 is bent in the shape of the letter U and buried in the probe 101 which is made from e.g. a resin. The guide rails 4a of the back plate 2 (FIG. 5) are adapted to engage in guide grooves 101a formed in both sides of the probe 101. When the lining 1 gets worn to some degree by the disk rotor (not shown), the lead wire 102 will be exposed and thus abraded by the disk rotor until eventually cut. When the wire is cut, a warning lamp goes on.

FIG. 7 is a perspective view of the resilient clip 5 for retaining the probe 101 inserted in the back plate 2. The clip 5 comprises two substantially U-shaped strips 5c connected together by a connecting strip 5b having projections 5a at both ends. The projections 5a engage the shoulders 4c and prevent the resilient clip 5 from dropping.

FIG. 8 is a top plan view in which the cutout 4 is viewed from above with the brake pad 3, probe 101 and resilient clip 5 assembled together. In FIG. 8, to mount the probe 101 on the back plate 2, the guide grooves 101a of the probe 101 are slid along the guide rails 4a of the cutout 4 formed in the back plate 2 to engage the back plate. Then the resilient clip 5 is pressed onto the back plate 2 of the brake pad 3 so that its strips 5c engage both sides of the plate 2. The strips 5c of the clip 5 will deflect along the tip shapes of the two projections 5a at both ends of the connecting strip 5b. When they snap in and engage the shoulders 4c of the cutout 4, they are assembled together.

In this state, the probe 101 is bound by the engagement between the shoulders 4c of the cutout 4 and the projections 5a of the clip 5, so that there is no freedom of movement in the vertical direction. Also, bound by the engagement between the guide rails 4a of the cutout 4 and the guide grooves 101a of the probe 101, there is no freedom in the groove direction. But they are formed such that clearances S (FIG. 8) are present between the back plate 2 and the side faces of the guide grooves 101a of the probe 101 in the thickness direction due to the resilience of the strips 5c of the clip 5.

The reason why the clearances S are present is described with reference to sectional views 9A and 9B in which the probe 101 in the cutout 4 is viewed from the side. FIG. 9A shows the lining 1 when it is brand-new. FIG. 9B shows a state in which the lining 1 has been worn to the wear limit X until the lead wire 102 has been cut by the disk rotor 10, so that the warning lamp is now on. As the lining 1 is abraded, the probe 101 made of resin is brought into contact with and abraded by the disk rotor 10, which is made of cast iron.

During this process, if there were no clearances S and thus there were no freedom of movement between the guide rails 4a of the cutout 4 and the guide grooves 101a of the probe 101, the lining 1 and the disk rotor 10 would collide impulsively against each other upon abrupt braking and the probe 101 and the rotor be exposed to shock, so that the probe 101, made from a weaker material, would be broken, making it impossible to stably detect the wear limit X. The clearances S serve to absorb such shocks. The probe 101 is thus abraded in a normal manner, so that the lead wire 102 is cut at a predetermined position.

In this conventional arrangement, the straight guide rails provided in the cutout of the back plate are adapted to engage in the guide grooves of the probe. The probe is snapped in and engaged with the shoulders of the cutout of the back plate, held by the resilient clip, so that it can be easily attached and detached. Since the probe is kept resiliently fastened to the disk rotor by the resilient clip, it is protected against collision against the disk rotor, so that it is possible to stably detect the wear limit.

But when expandable brake pads are repeatedly replaced, the disk rotor will become slender as shown in FIG. 10. In order that the lining is used effectively, the lining 1 of the brake pad is usually mounted so that its outer edge will be 1–2 mm radially inside the outer edge of the rotor 10. This means that the outer annular edge of the rotor does not contact the lining, so that an annular rib 10a is formed along the outer edge of the rotor 10. When the disk rotor 10 has been abraded by the lining to the depth of H, the lead wire 102 will be cut by the rib 10a even though the thickness of the liner 1 is still Y, which is larger than the wear limit X by an amount H.

If only the brake pad is replaced repeatedly with the same disk rotor, the rib 10a will increase and thus the thickness Y of the lining when the wire is cut by the rib 10a will become larger. This means that the warning lamp goes on even though the lining 1 is still sufficiently thick and usable. When the lamp goes on, an operator will check the lining. But since the lining is still sufficiently thick, he will judge that the alarm is false and keep on using the pad instead of replacing it with a new one, not knowing the fact that the disk rotor is getting dangerously thin. When the height of the rib 10a increases to a certain value, the piston will have to move a distance beyond a point at which the piston disengages from the fluid seal member to move the lining into frictional contact with the rotor. If this happens, fluid will leak.

An object of the present invention is to provide a lead wire shaped such that it will be cut at a use limit height H of the rib 10a of the rotor, or at the wear limit X of the lining 1.

SUMMARY OF THE INVENTION

According to the invention, there is provided a brake pad wear detector for detecting the wear of brake pads each having a lining and a back plate and arranged at both sides of a disk rotor, the brake pad wear detector comprising a probe detachably mounted in the outer peripheral portion of the back plate of the brake pad, and a lead wire buried in the probe, the lead wire being curved so as to protrude by a predetermined distance toward the disk rotor, the predetermined distance being larger than a predetermined maximum allowable height of an annular rib formed on the disk rotor at an outer peripheral portion thereof after continued use in a prolonged time of period.

Other features and objects of the present invention will become apparent from the following description made with reference to the accompanying drawings, in which:

DETAILED DESCRIPTION OF THE PREFERRED EMBODIMENT

Figure 1:
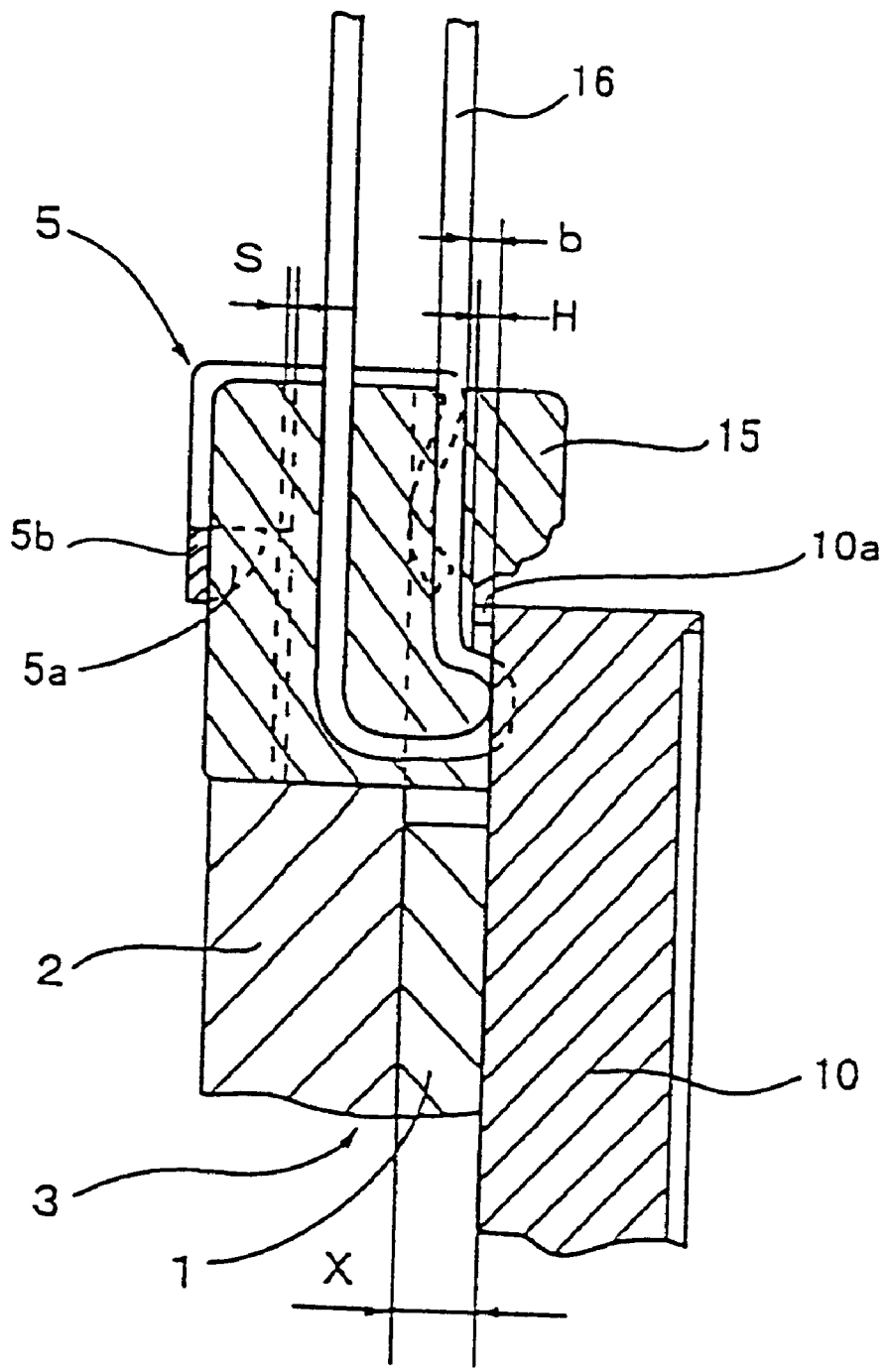
FIG. 1 is a sectional view of a probe according to the present invention showing the state in which it has reached the wear limit of the lining.

A preferred embodiment is described in detail with reference to the drawings. FIG. 1 is a sectional side view of a probe 15 mounted in the cutout formed in the back plate 2 when the lining 1 has been abraded to the wear limit X. By this time, the disk rotor 10 has been abraded by not one but many pads 3 that have been replaced, so that an annular rib 10a (height=H) has formed along its outer edge. The lead wire 16 is curved to protrude by a distance b toward the disk rotor 10 at its bottom end. With this arrangement, even if the annular rib 10a is formed on the disk rotor 10, the wire will not be cut until the lining 1 is abraded to the wear limit X. If the height H is assumed to be the maximum allowable height of the rotor, the wire should be shaped to satisfy the relation b≧H.

Figure 2:
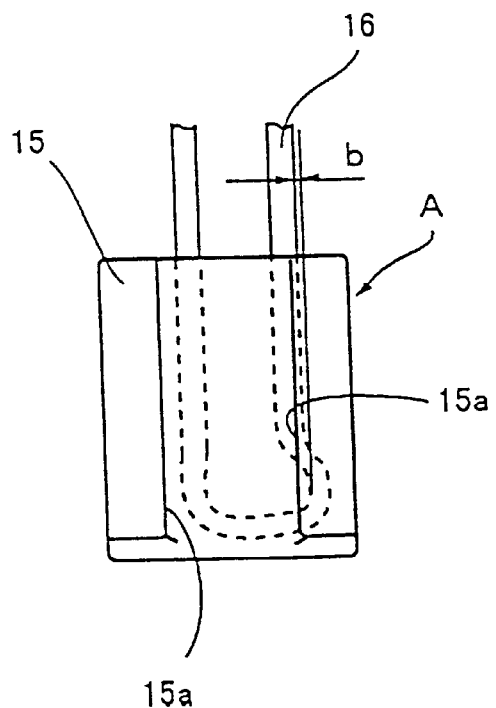
FIG. 2 is a side view of a wire-cut type probe according to the present invention.
Figure 5:
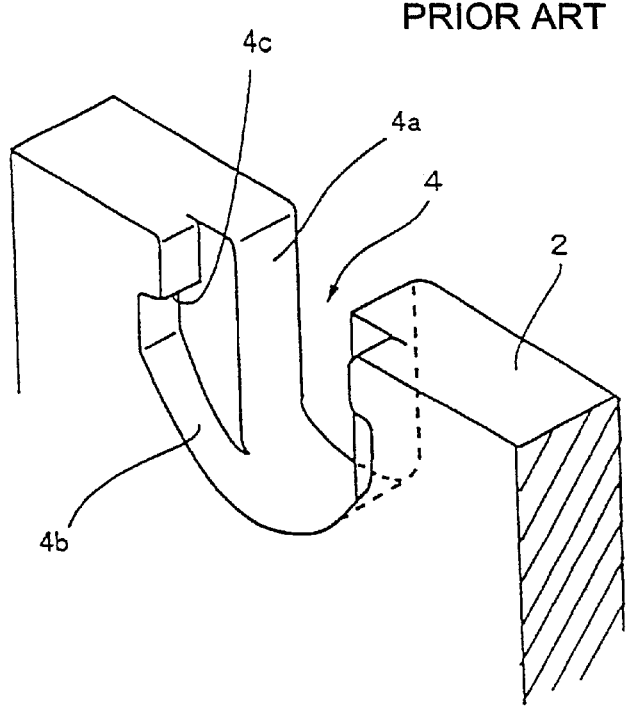
FIG. 5 is a perspective view of a cutout formed in the back plate of the same.
Figure 6:
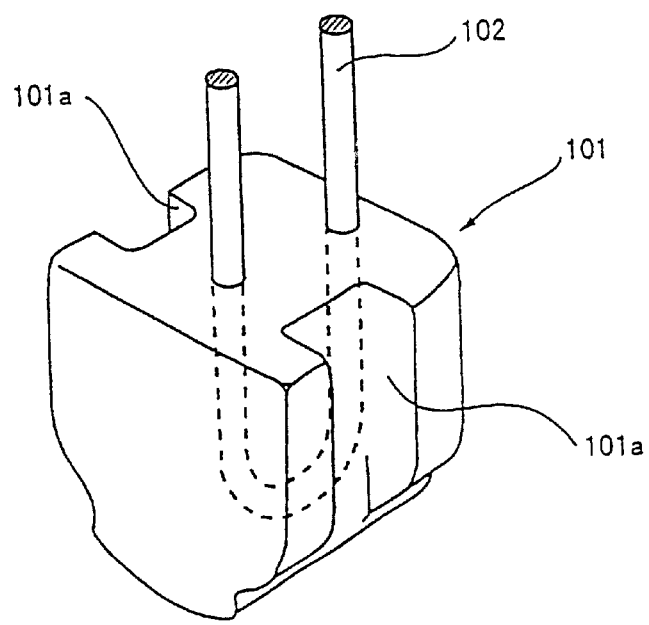
FIG. 6 is a perspective view of a conventional probe.
Figure 7:
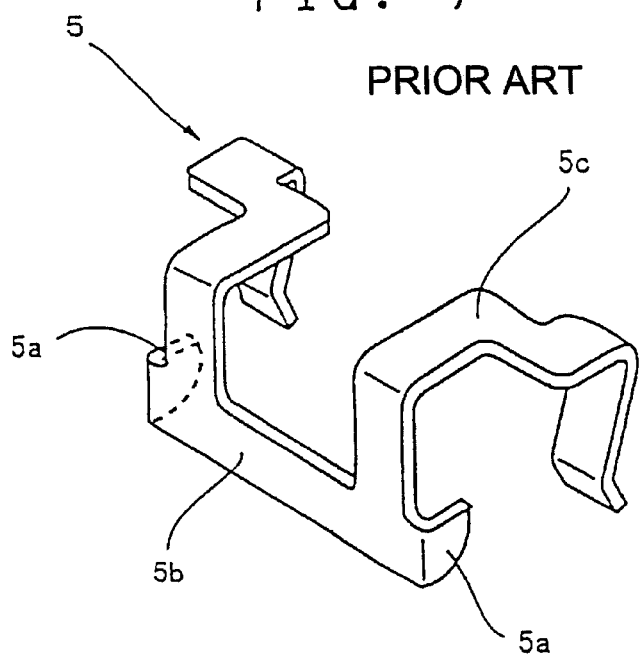
FIG. 7 is a perspective view of a conventional resilient clip.

FIG. 2 is a side view of a probe 15 having a guide groove 15a. The appearance and shape of the probe 15 are identical to those of the probe shown in FIG. 5, except that its lead wire 16 has its side A facing the disk rotor 10 curved to protrude a distance b toward the rotor 10 at its bottom.

Figure 3:
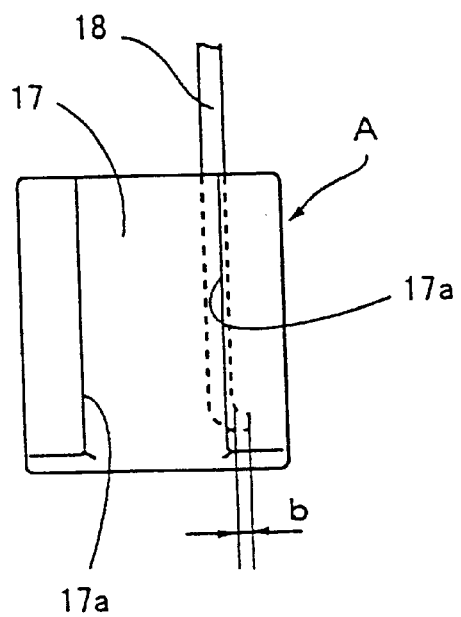
FIG. 3 is a side view of a contact type probe according to the present invention.
Figure 4:
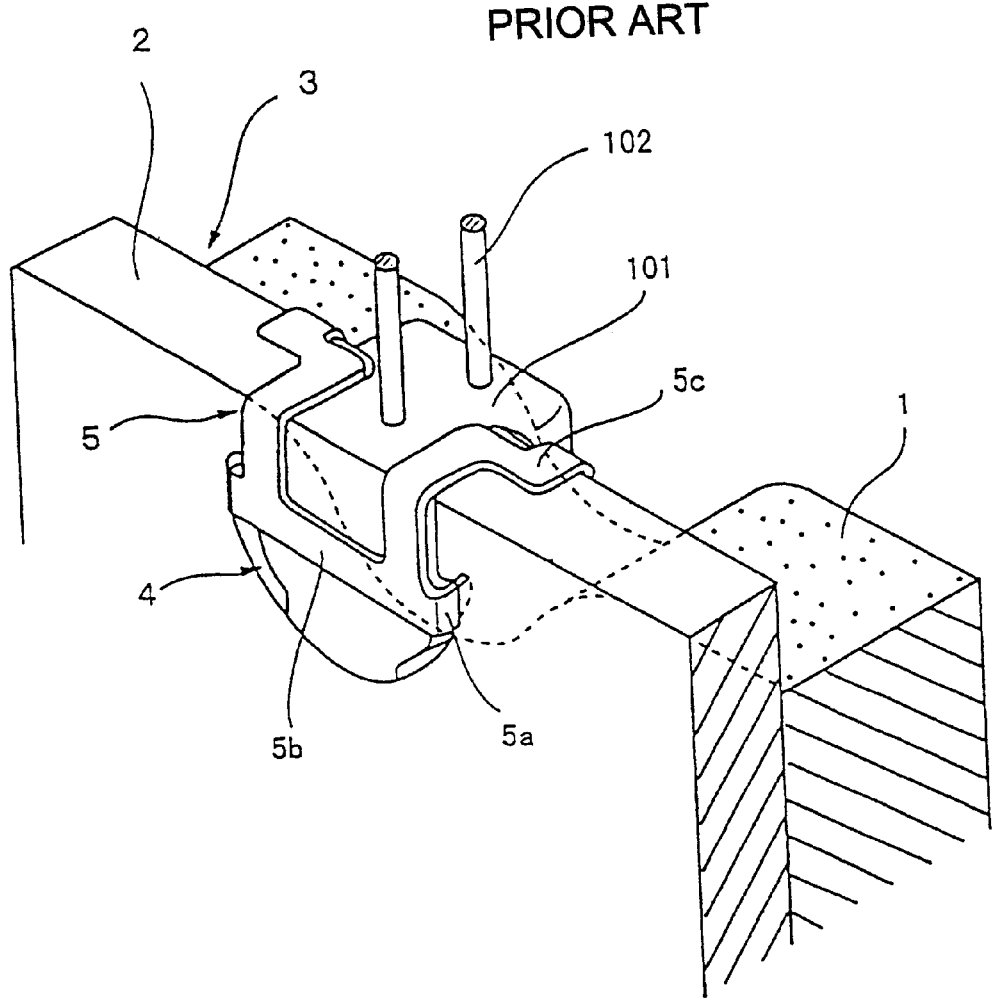
FIG. 4 is a perspective view of a conventional brake pad wear detector.

FIG. 2 illustrates the cut-wire type probe 15. But a contact type probe 17 shown in FIG. 3, which has its minus terminal grounded to the car body, will achieve the same results. Like the probe of FIG. 1, a lead wire 18 has its side A facing the disk rotor 10 curved to protrude by a distance b toward the rotor 10 at its bottom.

Ordinarily, the maximum allowable limit of the height H of the rib 10a of the disk rotor 10 is set at around 1 mm. If the disk is abraded by a plurality of pads 3 that have been changed, until the height of the rib 10a grows equal to or larger than the value b, the lead wire 16 will be cut not by the frictional surface of the rotor but by its rib 10a, and a warning lamp will go on. This will tell you the time to replace the brake pad earlier than usual and that the height of the rib has reached an allowable limit beyond which liquid leakage would occur.

Figure 8:
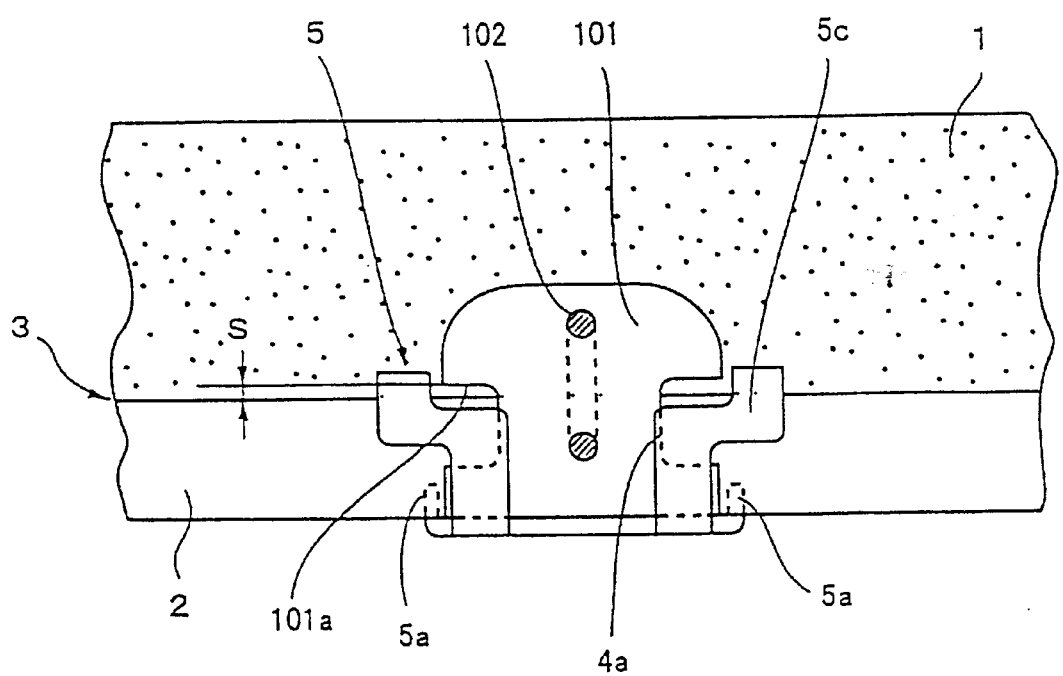
FIG. 8 is a plan view of a conventional brake pad wear detector.
Figure 9A:
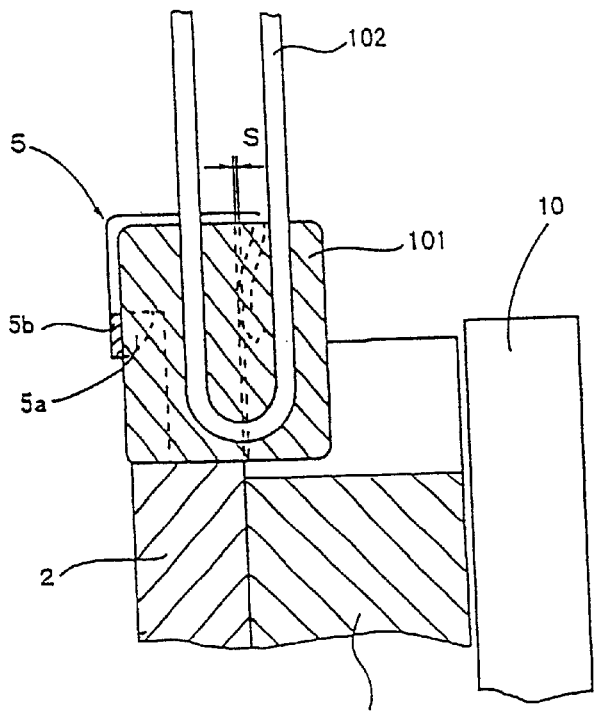
FIG. 9A is a sectional view of a conventional probe having a brand-new lining.
Figure 9B:
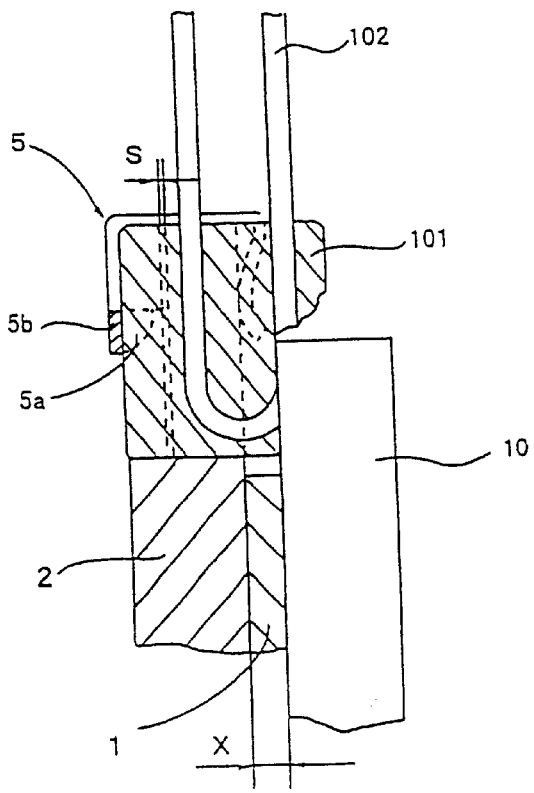
FIG. 9B is a sectional view of a conventional probe when the lining has reached its wear limit.
Figure 10:
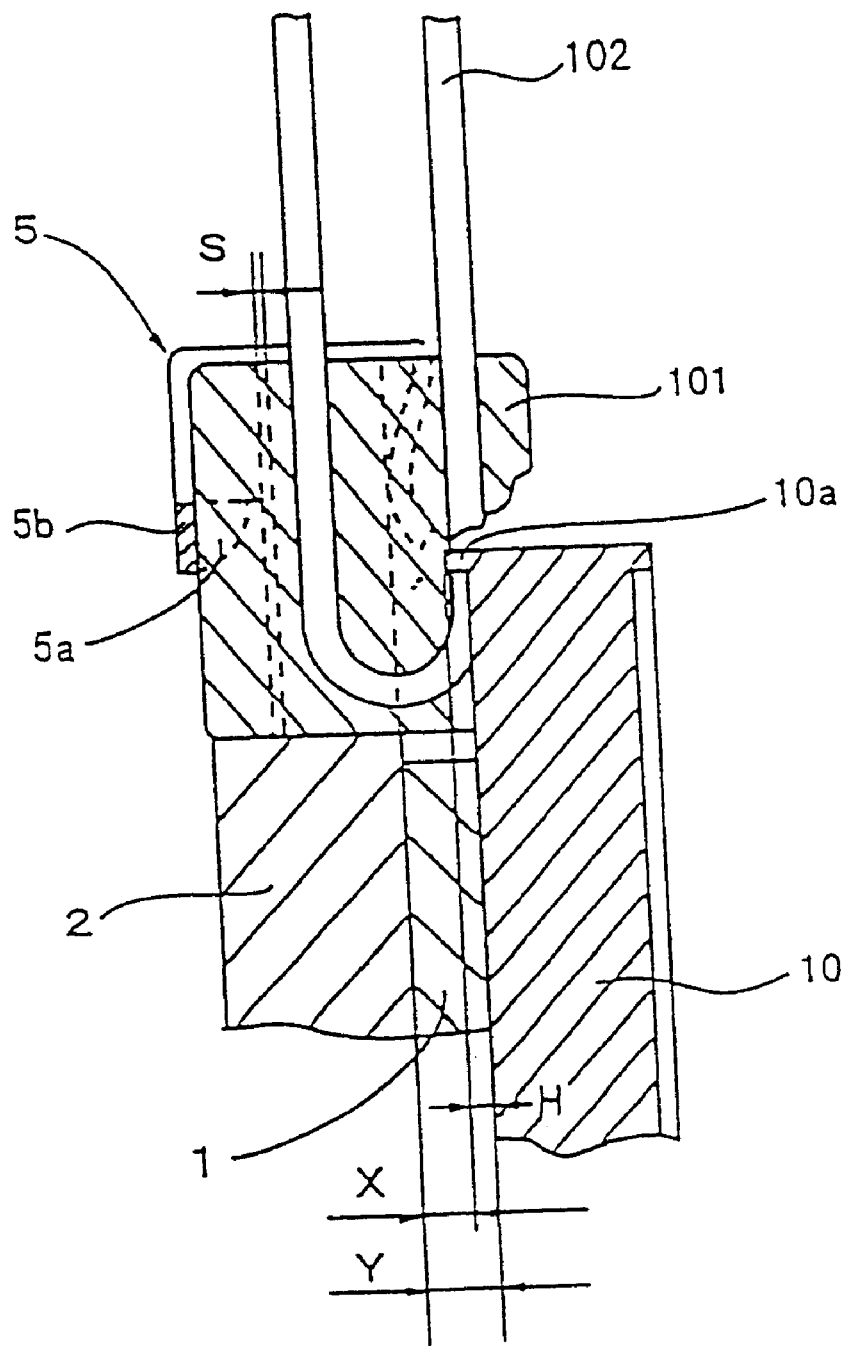
FIG. 10 is a sectional view of a conventional probe on which a rib has formed on the disk rotor at its outer peripheral portion.

The probes 15, 17 of the present invention may be assembled in exactly the same manner as the conventional probe of FIG. 8, and have the same clearances S provided by the resilient clip 5. The function of the clearance S is exactly the same as in FIG. 9.

Whether it is a cut-wire type or contact type, since the lead wire embedded in the probe made of a resin according to the present invention is curved to protrude toward the disk rotor, while the disk rotor is brand-new, or even after repeated changes of pads and after the disk rotor has developed an annular rib at its outer circumference, it is possible to determine when the brake pad has been worn to the wear limit of its lining.

Further, when the height of the annular rib on the sliding surface of the disk rotor becomes higher than the use limit of the disk rotor, the lead wire will be cut at its portion other than the right portion. This tells the operator that the piston on the disk brake side has protruded beyond the limit and disengaged from the liquid seal member, so that there is a risk of leakage of liquid.

What is claimed is:

1. A brake pad wear detector for detecting the wear of brake pads each having a lining and a back plate and arranged at both sides of a disk rotor, said brake pad wear detector comprising a probe detachably mountable in an outer peripheral portion of the back plate of the brake pad, and a lead wire buried in said probe, said lead wire having at least a first portion extending in a first direction, a second portion continuing from said first portion and being curved so as to extend in a second direction, and a third portion continuing from said second portion and extending in a third direction, said second portion protruding beyond said first portion and said third portion by a predetermined distance in a direction toward the disk rotor, said predetermined distance being larger than a predetermined maximum allowable height of an annular rib formed on the disk rotor at an outer peripheral portion thereof after continued use for a prolonged period of time, so that said second portion is engagable with the disk rotor prior to any engagement of the annular rib with either of said first and third portions.

2. The brake pad wear detector according to claim 1, wherein said lead wire is constructed and arranged to be severed by a portion of the disk rotor in order to detect the wear of the brake pad lining.

3. The brake pad wear detector according to claim 1, wherein said lead wire is constructed and arranged to be contacted by a portion of the disk rotor in order to detect the wear of the brake pad lining.

* * * * *

UNITED STATES PATENT AND TRADEMARK OFFICE
CERTIFICATE OF CORRECTION

PATENT NO. : 6,290,027 B1
DATED : September 18, 2001
INVENTOR(S) : Y. Matsuzaki

Page 1 of 1

It is certified that error appears in the above-identified patent and that said Letters Patent is hereby corrected as shown below:

Title page,
Item [57], ABSTRACT,
Line 4, after "and" insert -- a --.

Signed and Sealed this

Twenty-third Day of April, 2002

Attest:

JAMES E. ROGAN
*Attesting Officer*  *Director of the United States Patent and Trademark Office*